United States Patent
Bouge et al.

(10) Patent No.: US 7,475,197 B1
(45) Date of Patent: Jan. 6, 2009

(54) CROSS PROCESS MEMORY MANAGEMENT

(75) Inventors: Dietmar P. Bouge, Bedburg (DE); Paul G. Keller, Chapel Hill, NC (US)

(73) Assignee: NVIDIA Corporation, Santa Clara, CA (US)

( * ) Notice: Subject to any disclaimer, the term of this patent is extended or adjusted under 35 U.S.C. 154(b) by 287 days.

(21) Appl. No.: 11/259,181

(22) Filed: Oct. 25, 2005

(51) Int. Cl.
*G06F 13/16* (2006.01)

(52) U.S. Cl. ...................... 711/153; 711/147

(58) Field of Classification Search .............. 711/147, 711/150, 153, 170, 173
See application file for complete search history.

(56) References Cited

U.S. PATENT DOCUMENTS 5,790,130 A * 8/1998 Gannett ............... 345/587
7,412,492 B1 * 8/2008 Waldspurger ............... 709/216

* cited by examiner

*Primary Examiner*—Hyung S Sough
*Assistant Examiner*—Kenneth M Lo
(74) *Attorney, Agent, or Firm*—Townsend and Townsend and Crew LLP (57) ABSTRACT

A method for efficiently managing memory resources in a computer system having a graphics processing unit that runs several processes simultaneously on the same computer system includes using threads to communicate that additional memory is needed to avoid termination or less than optimal performance of a process. If the request indicates that termination will occur then other processes will reduce their memory usage to a minimum to avoid termination but if the request indicates that the process will not run optimally then the other processes will reduce their memory usage to 1/N where N is the count of the total number of running processes. The apparatus includes a computer system using a graphics processing unit and processes with threads that can communicate directly with other threads and with a shared memory which is part of the operating system memory.

1 Claim, 10 Drawing Sheets

CROSS PROCESS MEMORY MANAGEMENT

BACKGROUND OF THE INVENTION

The present invention relates generally to graphics data processing, and in particular to methods and systems for efficiently managing memory resources in a computer system having a graphics processing unit and running several processes simultaneously on the same computer system.

As computer graphics performance increases, the ability to handle ever larger amount of graphics data has become a crucial requirement for modern computer graphics systems. Rendering pipelines have been highly optimized to carry out tightly controlled flows of graphics computations. As graphical processing units are challenged to simultaneously run multiple processes this requirement for managing memory as well as other resources in a computer system has become more important.

Figure 1:
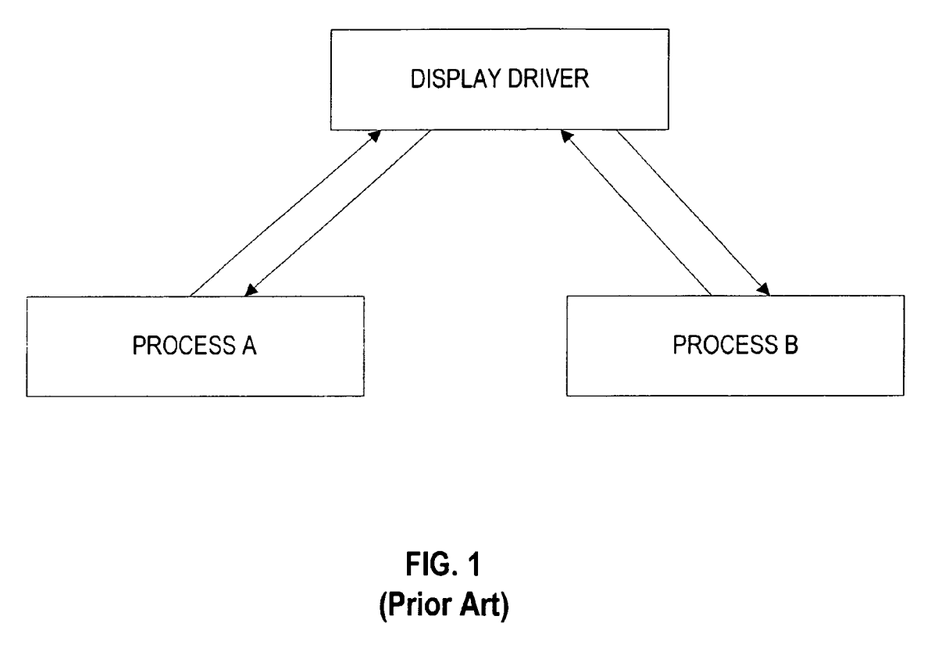
FIG. 1 is a block diagram illustrating the prior art method of communication between two processes running on one CPU.

FIG. 1 is a block diagram showing several simultaneously running processes communicating with each other to share memory so that all of processes can run simultaneously. FIG. 1 includes a first process A, a second process B, a display driver and arrows showing the communication lines between each other. Process A communicates directly with the display driver but does not communicate directly with process B. Similarly, process B communicates directly with the display driver but does not communicate directly with process A. Therefore, process A communicates with process B indirectly so that if either of these processes requires something from the other process, then it must do so through the display driver.

The display driver has knowledge of all processes and all global information including information such as the total available memory and the amount of memory being used by process A and process B. Although memory can be managed by using the display driver, it is very inefficient to do so because the amount of bookkeeping required to do this is considerable and doing so slows down the system. Another problem with using the display driver to manage the memory of the processes as depicted in FIG. 1 is that the freeing or reduction of memory usage is asynchronous to the other processes and could create problems with the operation of process A or process B. For example, correctness problems can occur in a scenario where process B requires additional memory and requests the additional memory from the display driver which in turn allocates memory to process B that was previously assigned to process A. The correctness problems would occur when process A attempts to access the reallocated memory because it was not updated in time as to the change in memory assignments. The problems resulting from this could be that process A erases whatever is in that part of the memory, which was probably written there by process B, or there could be an error because this resource does not exist, causing corrupt rendering. Corrupt rendering in the rendering process can include a corruption of the memory used in the rendering process. The methods of avoiding this correctness problem are prohibitively expensive in terms of performance for the common case of the memory not getting reallocated. That is, tracking the allocations to recover from the case when an allocation is removed slows down the common case when no allocation is moved.

Therefore, what is needed is a system and method that allow finite resources such as memory to be managed so that several processes can run efficiently at the same time on one system.

BRIEF SUMMARY OF THE INVENTION

Embodiments of the present invention provide techniques and apparatuses for efficiently managing memory resources in a computer system having a graphics processing unit and running several processes simultaneously on the same computer system.

In embodiments of the present invention, a method for efficiently managing the memory usage among several processes includes communicating directly between the several running processes to request and trigger the release of memory by any or all of the running processes depending on their actual memory use and needs in comparison to that of the other processes that are currently running. Each process can contain threads which are normally in an inactive mode and become active when a request to reduce memory is received. If the request to reduce memory indicates that another process will terminate if this other process does not have access to additional memory, then the process receiving this request reduces its memory usage to a minimum so that it only uses enough memory to operate minimally. However, if the request to reduce memory indicates that another process is not operating optimally, then the process receiving the request will reduce its memory usage to 1/N where N is the total number of running processes, if it can. In this embodiment the processes also communicate directly with a shared memory, which stores a count N of the total number of running processes. This count N is used to adjust the memory usage to operate optimally.

In another embodiment of the present invention a method for efficiently managing the memory usage among several processes includes receiving a request from one process to reduce memory usage directly from another process through the use of a slave thread. This request is sent by a thread and activates the other slave thread running in the process that receives the request to reduce memory usage. The memory usage is immediately reduced to 1/N and then the slave thread is inactivated for a period of time lasting for up to 3 seconds and preferably being 2 seconds. After this period the slave thread is activated again and determines if any rendering activity has occurred during the period. If no activity has occurred then the process reduces all memory usage thereby freeing up the memory for other processes.

In other embodiments of the present invention a computer system with a graphics processing unit is adapted to efficiently manage memory when several processes are simultaneously running on the same system. The computer system is adapted to include several processes that each have at least one thread and each are running at least one application. Additionally the computer system includes a shared memory for storing a count corresponding to the total number of concurrently running processes. The processes can communicate directly with each other through the threads and request that each reduce their memory under certain circumstances. The processes are also configured to communicate directly with the shared memory which can be part of the operating system.

DETAILED DESCRIPTION OF THE INVENTION

Embodiments of the present invention provide techniques and apparatuses for efficiently managing memory resources in a computer system having a graphics processing unit and running several processes simultaneously on the same computer system. The method includes using processes which can communicate directly with each other, rather than through an intermediary. By communicating directly with each other the different processes can efficiently adjust their memory usage so that the entire system can run optimally.

Figure 2:
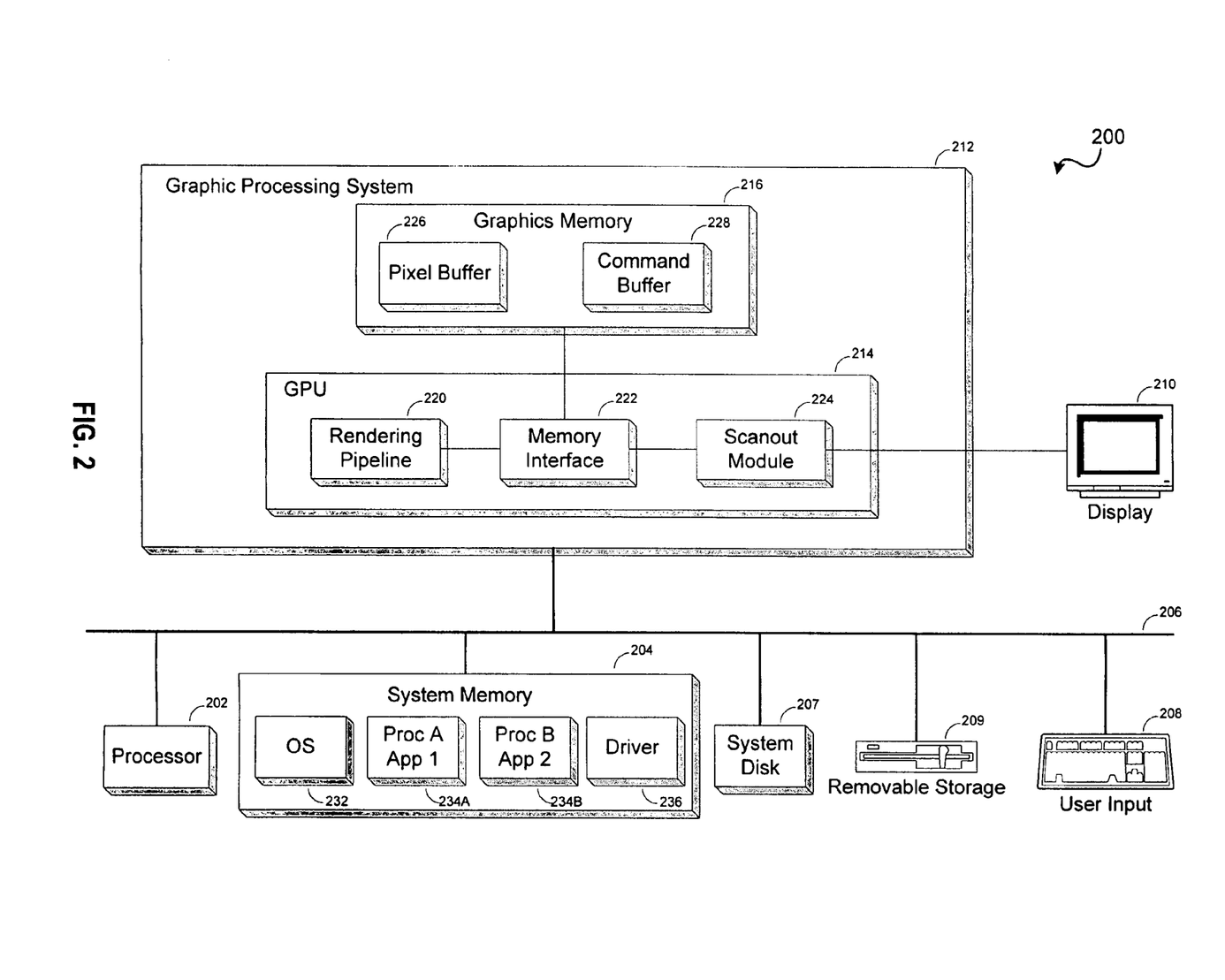
FIG. 2 is a block diagram of an illustrative computer system in which graphics operations may be performed in accordance with the present invention.

FIG. 2 is a block diagram of a computer system 200 that includes a central processing unit (CPU) 202 and a system memory 204 communicating via a bus 206. User input is received from one or more user input devices 208 (e.g., keyboard, or mouse) coupled to bus 206. Visual output is provided on a pixel based display device 210 (e.g., a conventional CRT or LCD based monitor) operating under control of a graphics processing subsystem 212 coupled to system bus 206. A system disk 207 and other components, such as one or more removable storage devices 209 (e.g., floppy disk drive, compact disk (CD) drive, and/or DVD drive), may also be coupled to system bus 206. System bus 206 may be implemented using one or more of various bus protocols including PCI (Peripheral Component Interconnect), AGP (Advanced Graphics Processing) and/or PCI-Express (PCI-E); appropriate "bridge" chips such as a north bridge and south bridge (not shown), may be provided to interconnect various components and/or buses.

Graphics processing subsystem 212 includes a graphics processing unit (GPU) 214 and a graphics memory 216, which may be implemented, e.g., using one or more integrated circuit devices such as programmable processors, application specific integrated circuits (ASICs), and memory devices. GPU 214 includes a rendering module 220, a memory interface module 222, and a scanout module 224. Rendering module 220 may be configured to perform various tasks related to generating pixel data from graphics data supplied via system bus 206 (e.g., implementing various 2-D and or 3-D rendering algorithms), interacting with graphics memory 216 to store and update pixel data, and the like. Rendering module 220 is advantageously configured to generate pixel data from 2-D or 3-D scene data provided by various programs executing on CPU 202. Operation of rendering module 220 is described further below.

Memory interface module 222, which communicates with rendering module 220 and scanout control logic 224, manages interactions with graphics memory 216. Memory interface module 222 may also include pathways for writing pixel data received from system bus 206 to graphics memory 216 without processing by rendering module 220. The particular configuration of memory interface module 222 may be varied as desired, and a detailed description is omitted as not being critical to understanding the present invention.

Graphics memory 216, which may be implemented using one or more integrated circuit memory devices of generally conventional design, may contain various physical or logical subdivisions, such as a pixel buffer 226 and a command buffer 228. Pixel buffer 226 stores pixel data for an image (or for a part of an image) that is read and processed by scanout module 224 and transmitted to display device 210 for display. This pixel data may be generated, e.g., from 2-D or 3-D scene data provided to rendering module 220 of GPU 214 via system bus 206 or generated by various processes executing on CPU 202 and provided to pixel buffer 226 via system bus 206. In some implementations, pixel buffer 226 can be double buffered so that while data for a first image is being read for display from a "front" buffer, data for a second image can be written to a "back" buffer without affecting the currently displayed image. Command buffer 228 is used to queue commands received via system bus 206 for execution by rendering module 220 and/or scanout module 224, as described below. Other portions of graphics memory 216 may be used to store data required by GPU 214 (such as texture data, color lookup tables, etc.), executable program code for GPU 214 and so on.

Scanout module 224, which may be integrated in a single chip with GPU 214 or implemented in a separate chip, reads pixel color data from pixel buffer 218 and transfers the data to display device 210 to be displayed. In one implementation, scanout module 224 operates isochronously, scanning out frames of pixel data at a prescribed refresh rate (e.g., 80 Hz) regardless of any other activity that may be occurring in GPU 214 or elsewhere in system 200. Thus, the same pixel data corresponding to a particular image may be repeatedly scanned out at the prescribed refresh rate. The refresh rate can be a user selectable parameter, and the scanout order may be varied as appropriate to the display format (e.g., interlaced or progressive scan). Scanout module 224 may also perform other operations, such as adjusting color values for particular display hardware and/or generating composite screen images by combining the pixel data from pixel buffer 226 with data for a video or cursor overlay image or the like, which may be obtained, e.g., from graphics memory 216, system memory 204, or another data source (not shown). Operation of scanout module 224 is described further below.

During operation of system 200, CPU 202 executes various programs that are (temporarily) resident in system memory 204. These programs may include one or more operating system (OS) programs 232, one or more processes running application programs 234A and 234B, and one or more driver programs 236 for graphics processing subsystem 212. It is to be understood that, although these programs are shown as residing in system memory 204, the invention is not limited to any particular mechanism for supplying program instructions for execution by CPU 202. For instance, at any given time some or all of the program instructions for any of these programs may be present within CPU 202 (e.g., in an on-chip instruction cache and/or various buffers and registers), in a page file or memory mapped file on system disk 228, and/or in other storage space.

Process A 234A and Process B 234B may be, for instance, processes running video game applications that generate graphics data and invoke appropriate rendering functions of GPU 214 (e.g., rendering module 220) to transform the graphics data to pixel data. Other processes 234A and 234B may generate pixel data and provide the pixel data to graphics processing subsystem 212 for display. It is to be understood that any number of application programs that generate pixel and/or graphics data may be executing concurrently on CPU 202. Operating system programs 232 (e.g., the Graphical Device Interface (GDI) component of the Microsoft Windows operating system) may also generate pixel and/or graphics data to be processed by graphics card 212.

Driver program 236 enables communication with graphics processing subsystem 212, including both rendering module 220 and scanout module 224. Driver program 236 advantageously implements one or more standard application program interfaces (APIs), such as OpenGL, Microsoft DirectX, or D3D for communication with graphics processing subsystem 212; any number or combination of APIs may be supported, and in some implementations, separate driver programs 236 are provided to implement different APIs. By invoking appropriate API function calls, operating system programs 232 and/or processes 234A and 234B are able to instruct driver program 236 to transfer geometry data or pixel data to graphics card 212 via system bus 206, to control operations of rendering module 220, to modify state parameters for scanout module 224 and so on. The specific commands and/or data transmitted to graphics card 212 by driver program 236 in response to an API function call may vary depending on the implementation of GPU 214, and driver program 236 may also transmit commands and/or data implementing additional functionality (e.g., special visual effects) not controlled by operating system programs 232 or processes 234A and 234B.

In some implementations, command buffer 228 queues the commands received via system bus 206 for execution by GPU 214. More specifically, driver program 236 may write one or more command streams to command buffer 228. A command stream may include rendering commands, data, and/or state commands, directed to rendering module 220 and/or scanout module 224. In some implementations, command buffer 228 may include logically or physically separate sections for commands directed to rendering module 220 and commands directed to display pipeline 224; in other implementations, the commands may be intermixed in command buffer 228 and directed to the appropriate pipeline by suitable control circuitry within GPU 214.

Command buffer 228 (or each section thereof) is advantageously implemented as a first in, first out buffer (FIFO) that is written by CPU 202 and read by GPU 214. Reading and writing can occur asynchronously. In one implementation, CPU 202 periodically writes new commands and data to command buffer 228 at a location determined by a "put" pointer, which CPU 202 increments after each write. Asynchronously, GPU 214 may continuously read and process commands and data sets previously stored in command buffer 228. GPU 214 maintains a "get" pointer to identify the read location in command buffer 228, and the get pointer is incremented after each read. Provided that CPU 202 stays sufficiently far ahead of GPU 214, GPU 214 is able to render images without incurring idle time waiting for CPU 202. In some implementations, depending on the size of the command buffer and the complexity of a scene, CPU 202 may write commands and data sets for frames several frames ahead of a frame being rendered by GPU 214. Command buffer 228 may be of fixed size (e.g., 5 megabytes) and may be written and read in a wraparound fashion (e.g., after writing to the last location, CPU 202 may reset the "put" pointer to the first location).

In some implementations, execution of rendering commands by rendering module 220 and operation of scanout module 224 need not occur sequentially. For example, where pixel buffer 226 is double buffered as mentioned previously, rendering module 220 can freely overwrite the back buffer while scanout module 224 reads from the front buffer. Thus, rendering module 220 may read and process commands as they are received. Flipping of the back and front buffers can be synchronized with the end of a scanout frame as is known in the art. For example, when rendering module 220 has completed a new image in the back buffer, operation of rendering module 220 may be paused until the end of scanout for the current frame, at which point the buffers may be flipped. Various techniques for implementing such synchronization features are known in the art, and a detailed description is omitted as not being critical to understanding the present invention.

The system described above is illustrative, and variations and modifications are possible. A GPU may be implemented using any suitable technologies, e.g., as one or more integrated circuit devices. The GPU may be mounted on an expansion card, mounted directly on a system motherboard, or integrated into a system chipset component (e.g., into the north bridge chip of one commonly used PC system architecture). The graphics processing subsystem may include any amount of dedicated graphics memory (some implementations may have no dedicated graphics memory) and may use system memory and dedicated graphics memory in any combination. In particular, the pixel buffer may be implemented in dedicated graphics memory or system memory as desired. The scanout circuitry may be integrated with a GPU or provided on a separate chip and may be implemented, e.g., using one or more ASICs, programmable processor elements, other integrated circuit technologies, or any combination thereof. In addition, GPUs embodying the present invention may be incorporated into a variety of devices, including general purpose computer systems, video game consoles and other special purpose computer systems, DVD players, handheld devices such as mobile phones or personal digital assistants, and so on.

While a modern GPU such as the one described above may efficiently process images with remarkable speed, there continues to be a demand for ever higher graphics performance. Moreover this demand is enhanced when multiple processes are run concurrently on one system. In a system that only runs one process at a time resource management is not that difficult. However when demands require that multiple processes be run concurrently then resource management becomes more difficult. For example, one problem can be that one process is running and using a significant amount of memory and another process requires memory to run but there is insufficient free memory to run it. In order for both processes to run concurrently on the same system, the available memory must be managed so that both processes have sufficient memory to run.

Figure 3:
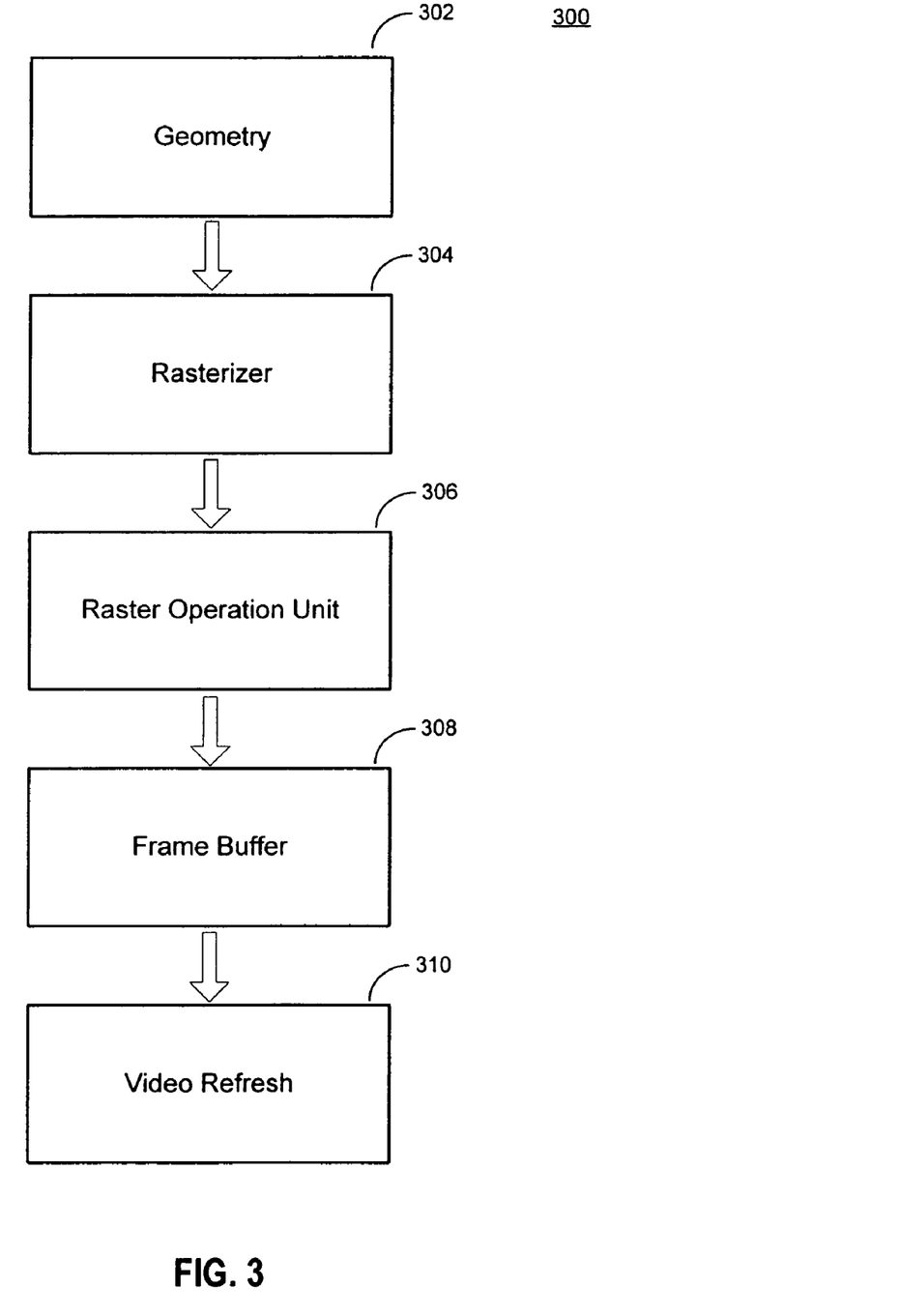
FIG. 3 is a block diagram of basic components in a 3D rendering pipeline.

FIG. 3 is a block diagram of basic components in a 3D rendering pipeline 300, which operates with rendering module 220. Pipeline 300 may be implemented in GPU 224 and memory 226 as described above. As shown, pipeline 300 includes a geometry block 302, a rasterizer block 304, a raster operation unit (ROP) block 306, a frame buffer block 308, and a video refresh block 310.

Geometry block 302 receives objects that make up a 3D scene to be rendered. For example, objects in a scene may be a table, a chair, a person, an animal, etc. Objects may be represented as groups of primitives, such as polygons and/or lines, with specified endpoints, or vertices, defined in a coordinate system. For instance, the entire outer surface of an object may be represented as a group of adjacently jointed triangles. In addition to location, each vertex may have various attributes associated with it. Such attributes may include red, green, and blue color components, a transparency parameter, texture coordinates relating the vertex location to a position within a texture map, etc.

Each object may have its own coordinate system. In addition, a "world" coordinate system may be defined within which the positions of different objects may be specified. According to one embodiment of the invention, geometry block 302 is capable of transforming object coordinates of each vertex to world coordinates.

Also, geometry block 302 may be capable of transforming objects from a world coordinate system to a view-plane-aligned coordinate system. Such a transformation may be performed by a block other than geometry block 302 in alternative embodiments. The new coordinate system is aligned with respect to a flat view plane through which the object scene is observed, from a particular point of view or vantage point. An example of a view plane is a screen. Here, the new coordinate system may be defined as (X, Y, Z) coordinates. The X and Y coordinates may correspond to up-and-down and left-and-right directions along the planar surface of the screen. The Z coordinate corresponding to depth "into" the screen. A view-plane-aligned coordinate system facilitates the two-dimensional representation of a three-dimensional object scene.

Rasterizer block 304 organizes data for objects in the form of a regular array, or raster, convenient for presentation using a display device. In one embodiment, rasterizer block 304 receives object data in screen-aligned coordinates. When viewed through a screen made up of pixels, an object may cover a certain group of the pixels. Each small portion of the object that is seen through a particular pixel may be defined as a fragment. Thus, for each object, rasterizer block 304 may compute a fragment for each pixel covered by the object. Also, a pixel may be only partially covered by an object. Accordingly, a coverage mask may be stored with each fragment to indicate which portions of the corresponding pixel are covered by the fragment.

ROP block 306 receives the fragments and performs various operations on the fragments to produce a rendered image. These operation may include z-testing, color or alpha blending, etc., as is know in the art. ROP block 306 may process fragments by reading from and writing to frame buffer 308, until the rendered image is completed as a frame in frame buffer 308. For example, for each fragment, ROP block 306 may retrieve a z-value from the frame buffer and possibly write back a new z-value. ROP may also write a color value to the frame buffer. ROP block 306 may thus proceed until a final z-value and final color value is written for each pixel and the rendered image is completed as a frame in frame buffer 308. Here, a z-value may refer to a depth value relating to distance between a specific location and a portion of an object in an object scene. Alternatively, a z-value may represent a characteristic other than depth, such as intensity of a color, brightness, and other quantities.

Video refresh block 310 reads frame buffer 308 and scans out each frame of pixel data to a display device, such as display device 228. As is known in the, many types of display devices require a frame to be repeatedly refreshed in order for the image of the frame to remain visible on the display device. Accordingly, video refresh block 310 may scan out a frame to the display device at a refresh rate, such as 80 Hz. The particular refresh rate implemented may depend on various considerations, such as the properties of the display device itself. In this manner, each frame may be displayed as a rendered image of the object scene. Furthermore, a sequence of such frames may make up a sequence of action or animation.

Figure 4A:
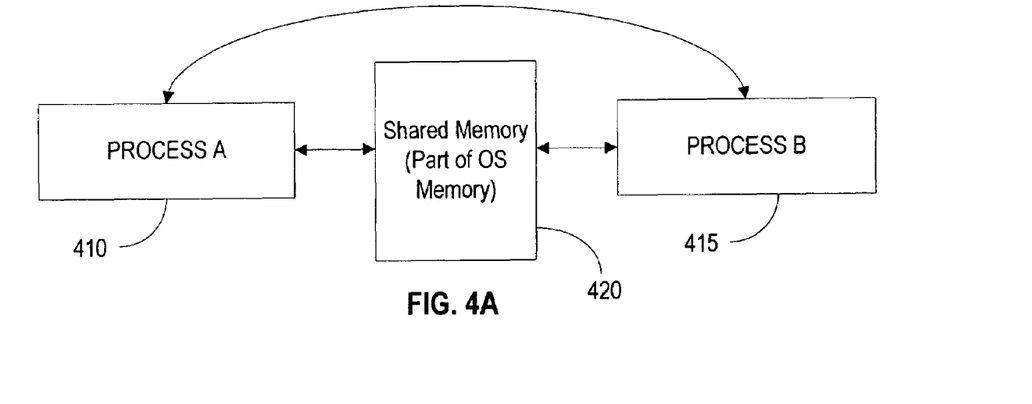
FIG. 4A is a block diagram illustrating communication between two processes running on one CPU in accordance with one embodiment of the invention.

FIG. 4A is a block diagram illustrating communication between two processes running on one CPU including a process A (410), a process B (415), a shared memory 420 and communication lines between these, in accordance with one embodiment of the invention. Process A 410 and process B 415 can communicate directly with each other via communication lines between them, instead of going through a third interface as described with reference to FIG. 1 above. Additionally, process A 410 and process B 415 can communicate with the shared memory 420 through the communication lines between them. The shared memory 420 is part of the operating system memory 132 and keeps track of how many processes are currently running and assigns a name to each of them uniquely. For example, in one embodiment process A 410 and process B 415 pick names such as A and B, respectively, or 1 and 2, respectively. When a third process is started, a third name of C or 3 is picked so that the system knows there is a maximum number of three processes running. If one of the processes drops out then when the next process attempts to connect, it notices that there is one less process than that maximum number and it only needs to take over the missing number's name. In this manner the information that is stored in the shared memory is the maximum number of running processes (i.e. maximum count). Additionally, the shared memory can contain synchronization primitives that are specific to the WINDOWS™ operating system. A further description of some methods used by process A 410 and process B 415 to communicate with each other is given below with reference to FIGS. 6A-7B.

Figure 4B:
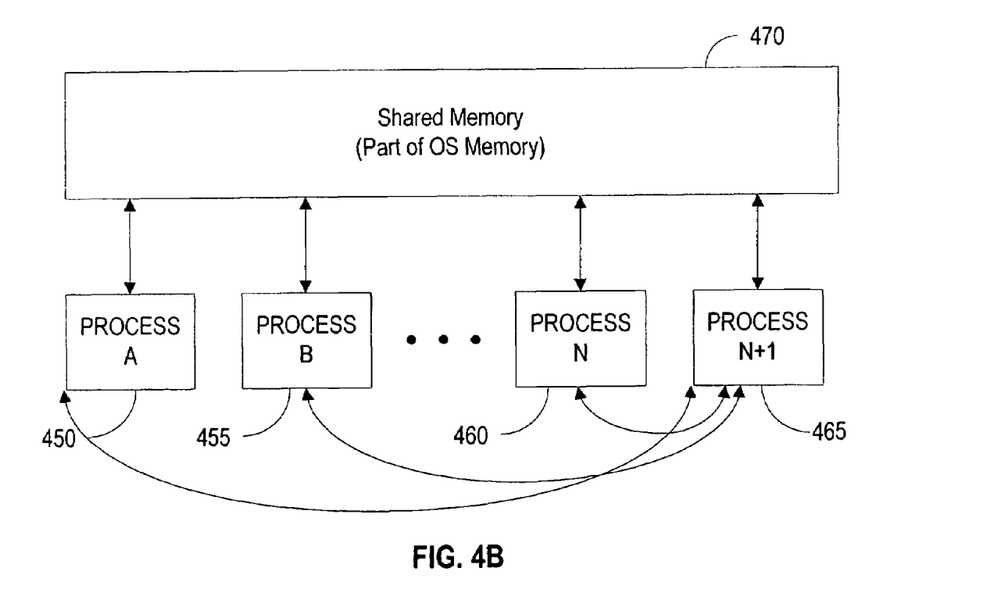
FIG. 4B is a block diagram illustrating communication between N+1 processes running on one CPU in accordance with one embodiment of the invention.

FIG. 4B is a block diagram illustrating communication between N+1 processes running on one CPU including a N+1 processes illustrated as processes A, B, . . . , N, N+1, which are labeled as 450, 455, 460, and 465 respectively, a shared memory 470 and communication lines between these components, in accordance with one embodiment of the invention. Processes A, B, . . . , N, and N+1 all communicate directly with the shared memory 470 as well as with each other. Although FIG. 4B only shows process N+1 communicating with all of the processes, all of the processes can communicate directly with each other. For example, process A communicates directly with process B, . . . , N, N+1, process B communicates directly with process A, . . . , N, N+1, process N communicates directly with process A, B, . . . , N+1, etc. The shared memory 470 is part of the operating system memory 132 and keeps track of how many processes are currently running and assigns a name to each of them uniquely. Shared memory 470 functions in the same manner as does shared memory 420 and stores the maximum number of running processes (i.e. max count) so that the description of shared memory 420 given with reference to FIG. 4A applies for shared memory 470. A further description of some methods used by the N+1 processes to communicate with each other is given below with reference to FIG. 8.

Figure 5:
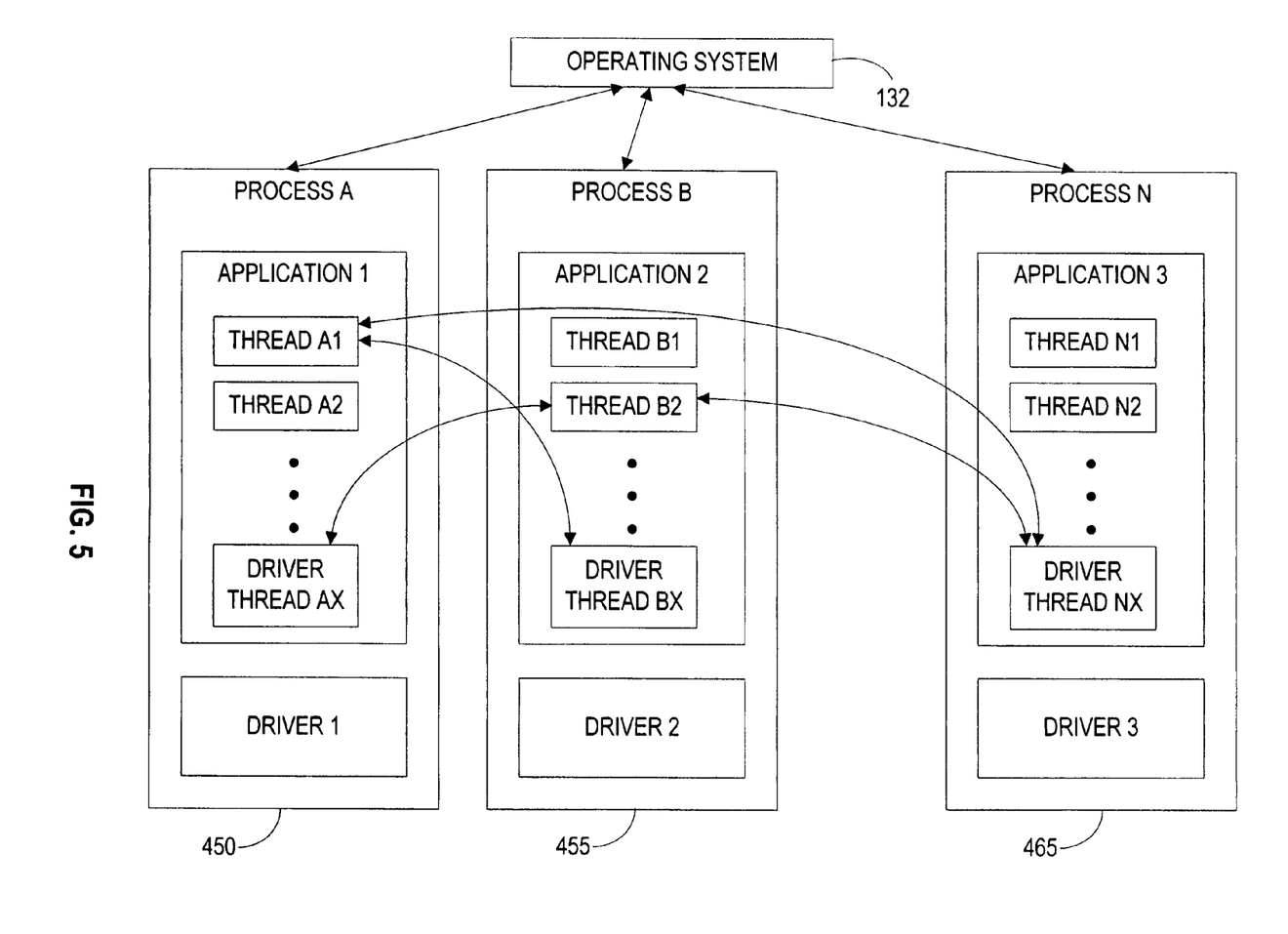
FIG. 5 is a block diagram illustrating an application having several processes and several threads running under an operating system.

FIG. 5 is a block diagram illustrating several processes running applications having several threads running under an operating system. FIG. 5 includes an operating system, processes A, B, . . . , N, with each process running Application 1, 2, . . . , N using a plurality of Threads A1, A2, . . . , AX, B1, B2, . . . BX, . . . N1, N2, . . . NX. The operating system 410 can be a MICROSOFT WINDOWS™ operating system or other operating system such as a LINUX™ operating system or SUN™ operating system, and the application 415 is an application using a graphics card. However, the present invention is not limited to graphics applications and can be used without applications that have a need for quick communication between different processes. The operating system 410 creates processes A, B, . . . , N for the purpose of running instances of the application 415.

Processes A, B, . . . , N include threads A1, A2, . . . , AX, B1, B2, . . . , BX, . . . N1, N2, . . . , NX, respectively, which are created by Application 1, 2, . . . , N respectively. Although FIG. 5 shows that each process has multiple threads, every process generally has at least one thread and can have multiple threads. Threads allow an application to perform multiple tasks concurrently. Since the threads share the same address space, one thread can modify data that is used by another thread. The threads ability to share and modify data is advantageous because it facilitates easy communication between threads. In one embodiment of the present invention, each process A, B, . . . , N contains several threads including a driver thread. Each of the threads in each process can communicate directly with the driver thread of the other processes. For example, FIG. 5 shows that Thread A1 located within Process a 450 communicates directly with Driver Thread AX of Process B and Driver Thread NX of process N. Similarly, Thread B2 located within Process B communicates directly with Driver Thread Ax of Process A and Driver Thread NX of Process N. In this embodiment the threads located in the different processes only communicate with the driver threads of the other processes but do not communicate directly with each other. In this embodiment the driver thread is always used to communicate between the other processes. The different threads communicate with each other through the use of semaphores whose names are determined by the maximum number of processes stored in the shared memory and labeled as Max count.

When a thread attempts to contact other threads from different processes it first obtains the Max count from the shared memory located in the operating system memory and then calls all of the semaphores. These semaphores can have names containing the process number such as bogiel sem 1, bogiel sem 2, 3, 4—up to the max count. If a semaphore corresponding to a specific process exists, then the process is still active. However, if the semaphore does not exist, then the corresponding process is inactive. Therefore, when a thread from a first process calls a semaphore, it either activates a thread in the other process if there is a semaphore or does nothing because both the process and semaphore are inactive.

Figure 6A:
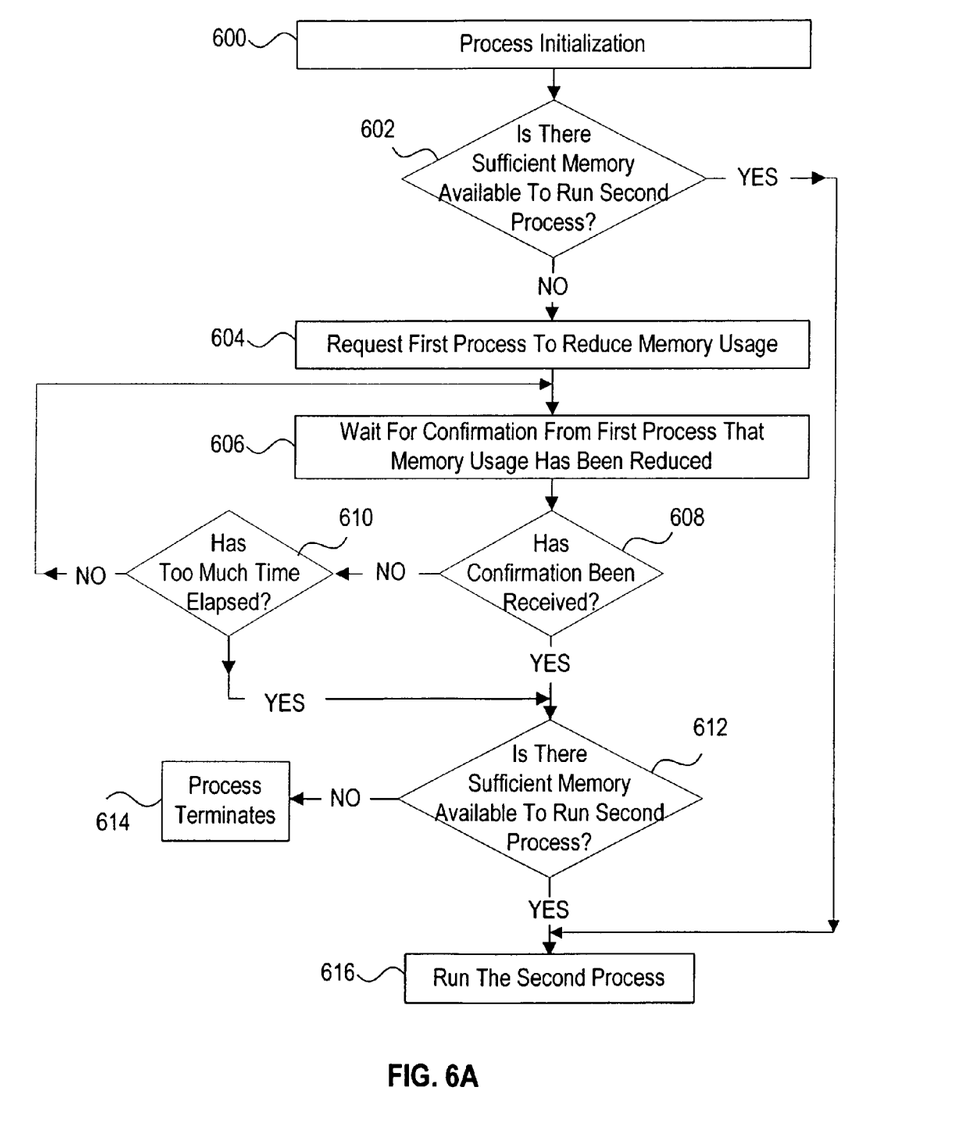
FIG. 6A is a flowchart showing the steps used by a process to request that another running process reduce its memory usage to avoid termination because it does not have access to sufficient memory, in accordance with one embodiment of the invention.

FIG. 6A is a flowchart showing the steps used by a process to request that another running process reduce its memory usage to avoid termination because it does not have access to sufficient memory to run. These steps are used by a second process to determine if there is sufficient available memory to start and if there is not sufficient memory available to start to request from the other running N processes to free some memory. In step 600 the process initialization takes place, which includes ascertaining the total available memory, the amount of memory required to run the first process, and the amount of memory required to run the new second process. These values are determined by either checking the available memory or requesting information from the applications indicating the amount of memory required to run these processes. Once all of the information regarding the memory usage is acquired, a decision is made in step 602 whether there is sufficient memory available to run the second process. If the decision, in step 602, is that there is sufficient memory available to run the second process, then the second process is started in step 616. If the decision in step 602 is that there is not sufficient memory available to run the second process, then a request is sent, in step 604, to the first process requesting the first process to reduce its memory usage and free up any memory that is not essential for its use. This second process then waits in step 606 until it receives a signal back from the first process. Step 608 checks and determines whether a confirmation signal has been received from the first process indicating that the first process has reduced its memory usage. If the decision in step 608 is that a confirmation signal has been received, then in step 612 another decision is made whether there is sufficient memory available to run the second process. However, if the decision in step 608 is that no signal has been received, then another check is done in step 610 to determine if too much time has elapsed. If the decision is that too much time has elapsed, then step 612 is performed but if the decision is that not enough time has elapsed then the process waits again in step 606. If the decision in step 612 is that there is sufficient memory available to run the second process, then the second process is started and run in step 616. However, if the decision in step 612 is that there is insufficient memory available to run the second process, then the process terminates in step 614. In the end, there will either be sufficient memory available to start the second process and the second process will start or an error message will be sent that the process is unable to start.

Figure 6B:
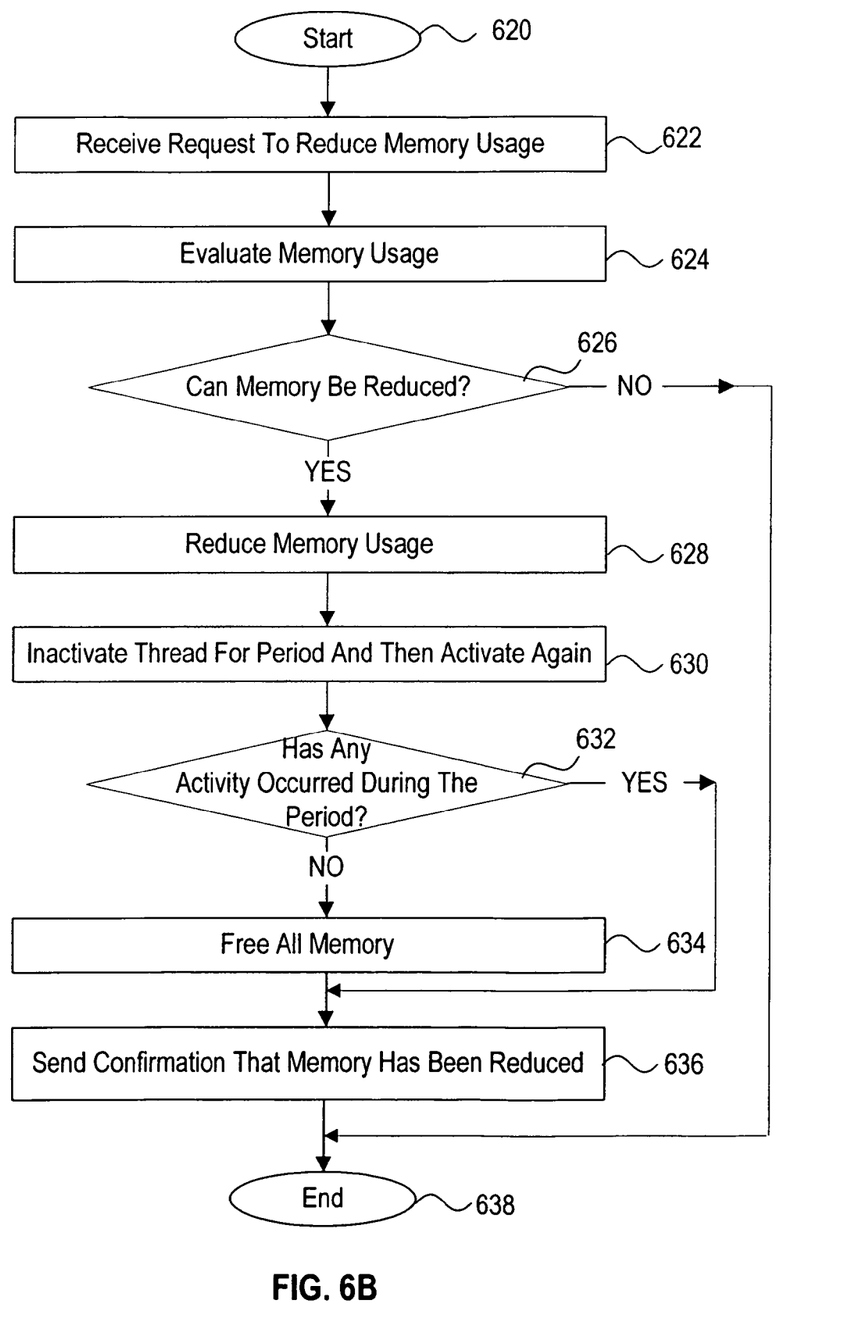
FIG. 6B is a flowchart showing the steps used by the other running process described in FIG. 6A to determine if it can free some memory for use by the requesting process of FIG. 6A, in accordance with one embodiment of the invention.

FIG. 6B is a flowchart showing the corresponding steps used by a first process to determine if it can free some memory for use by the second process of FIG. 6A, in accordance with one embodiment of the invention. In step 620, the first process starts and runs a thread that waits to receive a request to reduce the memory usage. In step 622, the first process receives the request to reduce its memory usage. Once this request is received the amount of memory being used and the purposes for which that memory is being used are evaluated in step 624. Next in step 626, a decision is made whether the amount of memory being used can be reduced. This decision is made by looking at how much memory is being used and then how much memory can be freed up without causing this first process to stop working. If the decision is that the memory usage cannot be reduced, then no more is done, and the thread goes into wait mode again until it receives another command. However, if the decision is that memory usage can be reduced, and therefore some memory can be freed for other uses then in step 628, then the memory usage is reduced. Next in step 630 the thread is inactivated for a period of time and then activated. This inactivation and activation of the thread can be caused by a programmed delay or by commands that are sent to the thread. The period of time is chosen so that it is long enough to determine if any activity has occurred but not so long that this process is slowed down. For example, in some embodiments the period of the time can last up to 3 seconds and is preferably 2 seconds. After this period of time elapses, in step 632 a decision is made whether any activity has occurred during the period of step 630. If the decision is that some activity has occurred during the time period, then in step 636 a message is sent to the second process confirming that the memory usage has been reduced. However, if the decision in step 632 is that no activity has occurred during the time period, then all of the memory is freed up by the second process in step 634. In step 636 a message is sent to the second process confirming that the memory usage has been reduced. All of the memory is freed in step 634 because the process interprets the inactivity during this time period as an indication that the process is no longer running, and there is, therefore, no need for it to use so much memory. Finally in step 638 the process ends.

Figure 7A:
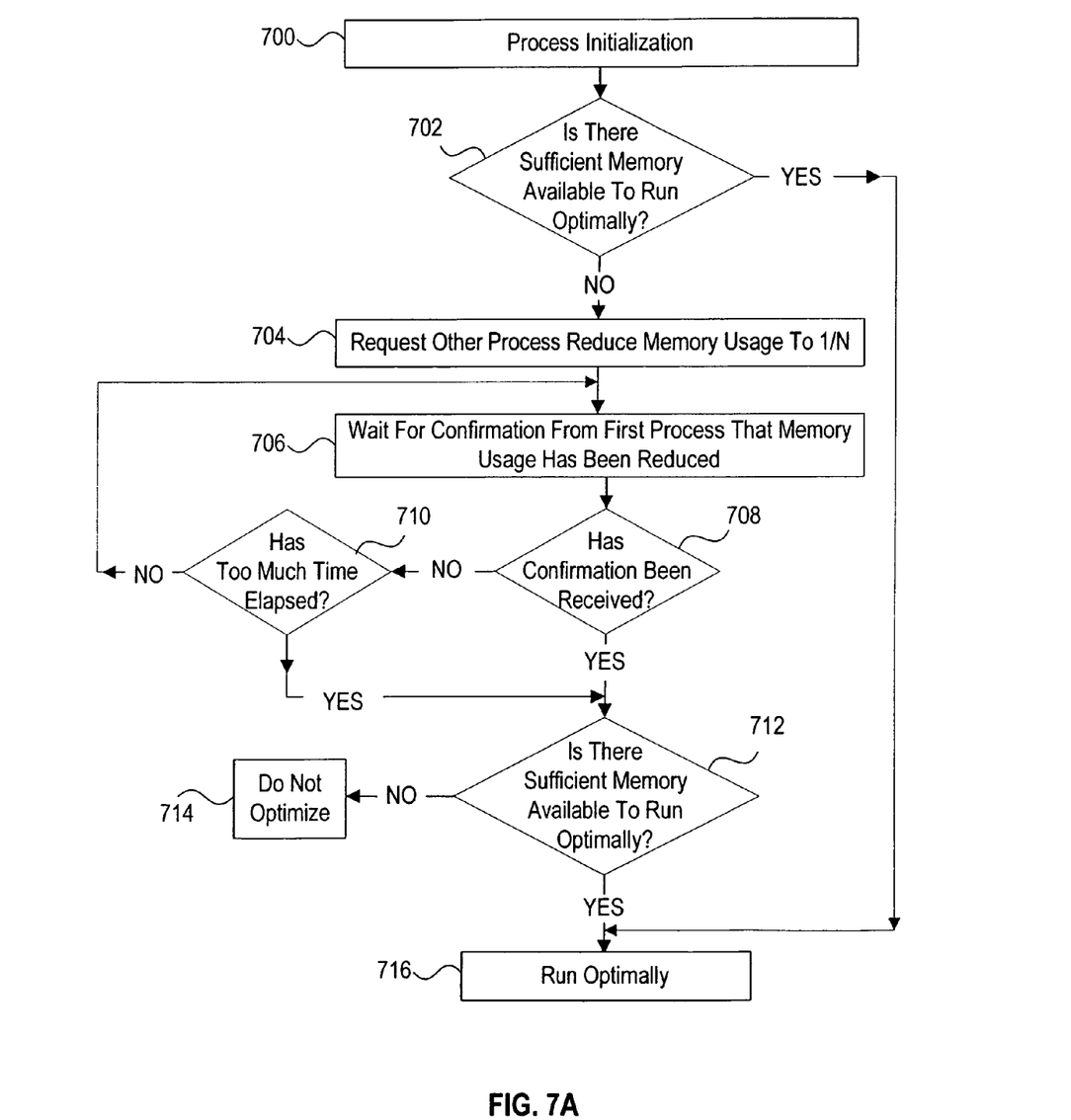
FIG. 7A is a flowchart showing the steps used by a process to optimize its performance including requesting other N running processes to reduce their memory usage, in accordance with one embodiment of the invention.

FIG. 7A is a flowchart showing the steps used by a process to request that another running process reduce its memory usage so that its performance is optimized. These steps can be used by any one of the processes running to determine if the total available memory is being used effectively for optimal system performance. In step 700 the process initialization takes place, which includes ascertaining the total available memory, the amount of memory required to run the each process, and the amount of memory each process is using. These values are determined by either checking the available memory or requesting information from the applications indicating the amount of memory required to run these processes. Once all of the information regarding the memory usage is acquired, a decision is made in step 702 whether there is sufficient memory available to run this process optimally. If the decision in step 702 is that there is sufficient memory available to run optimally, then the process is allowed to run optimally in step 716. However, if the decision in step 702 is that there is not sufficient memory available to run optimally, then a request is sent, in step 704, to another process requesting that it reduce its memory usage to 1/N of the total available memory, wherein N is the total number of processes running. This requesting process then waits in step 706 for a confirmation that the other process has reduced its memory usage. Step 708 checks and determines whether a confirmation signal has been received from the other process, indicating that the other process has reduced its memory usage. If the decision in step 708 is that a confirmation signal has been received, then in step 712 another decision is made whether there is sufficient memory available to run optimally. However, if the decision in step 708 is that no signal has been received, then another check is done in step 710 to determine if too much time has elapsed. If the decision is that too much time has elapsed, then step 712 is performed; but if the decision is that not enough time has elapsed, then the process waits again in step 706. If the decision in step 712 is that there is sufficient memory available to run optimally, then the requesting process acquires the memory necessary to run optimally and runs optimally in step 716. However, if the decision in step 712 is that there is insufficient memory available to run optimally, then optimization does not occur, and in step 714 the process continues to run in its non-optimized state. In the end, the process will either continue to run in its non-optimized state or it will have acquired more memory and operate in a more optimized state.

Figure 7B:
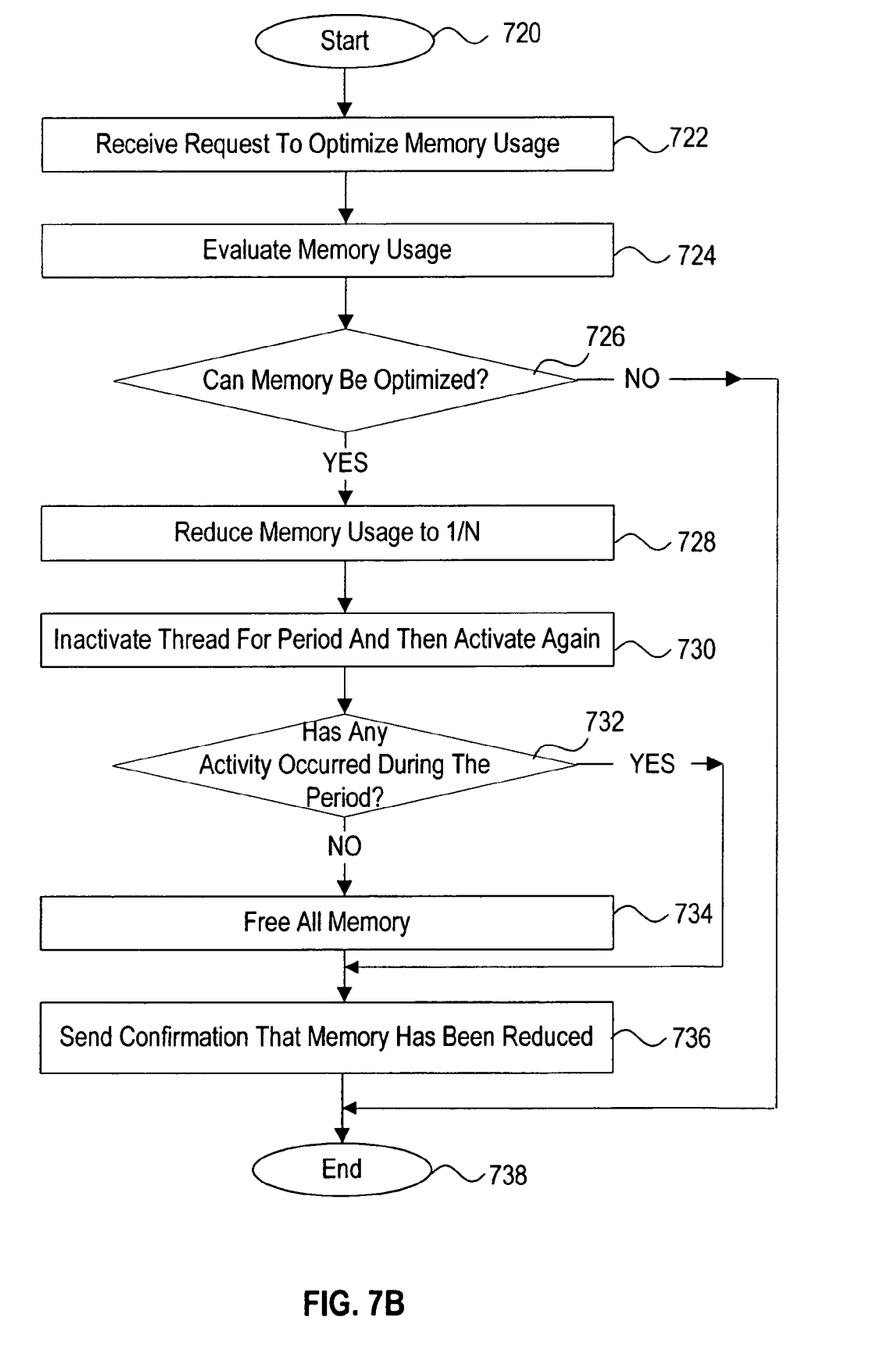
FIG. 7B is a flowchart showing the steps used by any one of the other N running process described in FIG. 7A to determine if they can free some memory for use by the requesting process of FIG. 7A, in accordance with another embodiment of the invention.

FIG. 7B is a flowchart showing the corresponding steps used by the process receiving a request to reduce its memory usage to determine if it can free some memory so that the requesting process of FIG. 7B can be optimized, in accordance with one embodiment of the invention. In step 720, all the processes are running with threads that wait to receive a request to reduce the memory usage. In step 722, a running process receives the request to reduce its memory usage. Once this request is received the amount of memory being used and the purposes for which that memory is being used is evaluated in step 724. Next in step 726, a decision is made whether the amount of memory being used can be reduced so that memory usage can be optimized. This decision is made by looking at how much memory is being used and then how much memory can be freed up without causing any of the processes to stop working. If the decision is that the memory usage cannot be reduced, then no more is done, and the thread goes into wait mode again until it receives another command. However, if the decision is that memory usage can be reduced and optimized, then in step 728 the memory usage is reduced to 1/N of the total available memory, wherein N is the total number of processes running. Next in step 730 the thread is inactivated for a period of time and then activated. This inactivation and activation of the thread can be caused by a programmed delay or by commands that are sent to the thread. The period of time is chosen so that it is long enough to determine if any activity is going on but not so long that this process is slowed down. For example, in some embodiments the period of the time can last up to 3 second and is preferably 2 seconds. After this period of time elapses, in step 732 a decision is made whether any activity has occurred during the period of step 730. If the decision is that some activity occurred during the time period, then in step 736 a message is sent to the requesting process confirming that the memory usage has been reduced to 1/N of the total available memory. However, if the decision in step 732 is that no activity occurred during the time period, then in step 734 all of the memory is freed up by the process which received the request and in step 736 a message is sent to the requesting process confirming that the memory usage has been reduced. All of the memory is freed in step 734 because the process interprets the lack of activity during this time period as an indication that the process is no longer running and therefore there is no need for it to use so much memory. Finally in step 738 the process ends.

Figure 8:
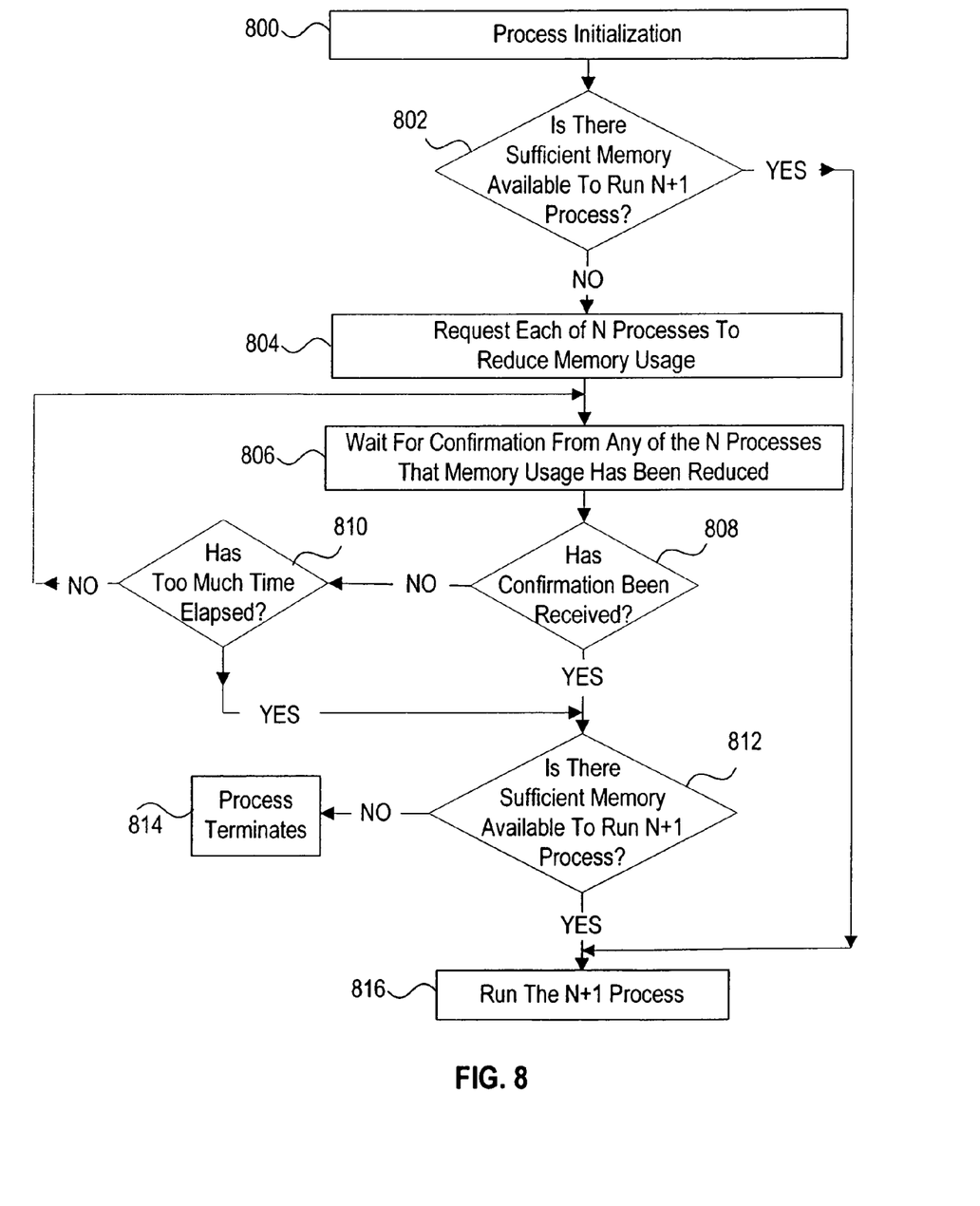
FIG. 8 is a flowchart showing a generalization of FIG. 6A for N running processes which includes the steps used by the N+1 process to request that another running process reduce its memory usage to avoid termination because it does not have access to sufficient memory, in accordance with yet another embodiment of the invention.

FIG. 8 is a flowchart showing the steps used by the N+1 process to request that another running process reduce its memory usage to avoid termination because it does not have access to sufficient memory to run. These steps are used by the N+1 process to determine if there is sufficient available memory to start and if there is not sufficient memory available to start to request from the other running N processes to free some memory. In step 800 the process initialization takes place which includes ascertaining the total available memory, the amount of memory required to run the N processes currently running, and the amount of memory required to run the new N+1 process. These values are determined by either checking the available memory or requesting information from the applications indicating the amount of memory required to run these processes. Once all of the information regarding the memory usage is acquired, a decision is made in step 802 whether there is sufficient memory available to run the N+1 process. If the decision in step 802 is that there is sufficient memory available to run the N+1 process, then the N+1 process is started in step 816. If the decision in step 802 is that there is not sufficient memory available to run the N+1 process, then a request is sent, in step 804, to each of the N running processes requesting that each of these N processes reduce their memory usage and free up any memory that is not essential for its use. This N+1 process then waits in step 806 until it receives a signal back from any of the N running processes. Step 808 checks and determines whether a confirmation signal has been received from any of the N running processes indicating that the any of the N processes has reduced its memory usage. If the decision in step 808 is that a confirmation signal has been received, then in step 812 another decision is made whether there is sufficient memory available to run the N+1 process. However, if the decision in step 808 is that no signal has been received from any of the N running processes, then another check is done in step 810 to determine if too much time has elapsed. If the decision is that too much time has elapsed, then step 812 is performed; but if the decision is that not enough time has elapsed, then the process waits again in step 806. If the decision in step 812 is that there is sufficient memory available to run the N+1 process, then the N+1 process is started and run in step 816. However, if the decision in step 812 is that there is insufficient memory available to run the N+1 process, then the process terminates in step 814. In the end, there will either be sufficient memory available to start the N+1 process and the N+1 process will start or an error message will be sent that the process is unable to start.

The flowchart showing the corresponding steps used by the N processes to determine if any of them can free some memory for use by the N+1 process is not shown because it is similar to the flowchart of FIG. 6A.

The embodiments described above with reference to FIGS. 7A-8 are examples of Recovery which includes the reallocation of memory between the different running processes when the processes are no longer running optimally. In general terms when processes are not running optimally, a request is sent out to N running processes to cap the memory usage to 1/N. After the memory usage is set to 1/N of the total memory, the actual memory usage drifts with time and can slowly creep up so that the system is not longer optimized. Therefore as the memory usage creeps up over time and the 1/N quota is surpassed by some threshold amount then the recovery takes place and the system must be optimized again.

It will be appreciated that the system described herein is illustrative and that variations and modifications are possible. The bus topology, including the number and arrangement of bridges, may be modified as desired. For instance, in some embodiments, system memory 104 is connected to CPU 102 through a bridge rather than directly, and other devices communicate with system memory 104 via bus 106 or a memory bridge and CPU 102. In other alternative topologies, graphics subsystem 112 is connected to an I/O bridge or a memory bridge rather than to bus 106. In still other embodiments, the I/O bridge and memory bridge might be integrated into a single chip which can be connected to a bus. Other optional components can include add-in cards or peripheral devices, switches, and network adapters. The connection of GPU 112 to the rest of system may also be varied. In some embodiments, GPU 112 is implemented as an add-in card that can be inserted into an expansion slot of system.

The GPU may be provided with any amount of local graphics memory, including no local memory, and may use local memory and system memory in any combination. For instance, in a unified memory architecture (UMA) embodiment, little or no dedicated graphics memory is provided, and the GPU uses system memory exclusively or almost exclusively. In UMA embodiments, the GPU may be integrated into a bus bridge chip or provided as a discrete chip with a high-speed bus (e.g., PCI-E) connecting the GPU to the bridge chip and system memory.

It is also to be understood that any number of GPUs may be included in a system, e.g., by including multiple GPUs on a single graphics card or by connecting multiple graphics cards to bus 106. Multiple GPUs may be operated in parallel to generate images for the same display device or for different display devices.

In addition, GPUs embodying the present invention may be incorporated into a variety of devices, including general purpose computer systems, video game consoles and other special purpose computer systems, DVD players, handheld devices such as mobile phones or personal digital assistants, and so on.

It will also be recognized by those skilled in the art that, while the present invention has been described above in terms of preferred embodiments, it is not limited thereto. Various features and aspects of the above-described invention may be used individually or jointly. Further, although the invention has been described in the context of its implementation in a particular environment and for particular applications, those skilled in the art will recognize that its usefulness is not limited thereto and that the present invention can be utilized in any number of environments and implementations.

What is claimed is:

1. A method for managing memory used by a plurality of processes, comprising:
    making a decision whether any of said plurality of processes can reduce memory usage, wherein said decision is made by comparing a memory requirement of each process with an actual memory usage of each process;
    communicating directly between said plurality of processes to trigger a reduction of memory usage by each processes that can reduce memory usage;
    running a first thread in a first process of said plurality of processes that waits to receive a request to reduce its memory usage, said request sent directly from a second process of said plurality of processes that requires additional memory;
    determining if said first process can continue to operate with less memory;
    reducing memory usage of said first process if a determination is made that said first process can continue to operate with less memory; and
    wherein the memory usage of said first process is minimized such that said first process only uses enough memory to operate without terminating, if said request from said second process indicates that said second process will terminate if said second process does not have access to additional memory.

* * * * *